(12) United States Patent
Wu (10) Patent No.: US 8,982,461 B2
(45) Date of Patent: Mar. 17, 2015

(54) POLARIZER

(71) Applicant: Tianjin Funayuanchuang Technology Co., Ltd., Tianjin (CN)

(72) Inventor: Ho-Chien Wu, Hsinchu (TW)

(73) Assignee: Tianjin Funayuanchuang Technology Co., Ltd., Tianjin (CN)

( * ) Notice: Subject to any disclaimer, the term of this patent is extended or adjusted under 35 U.S.C. 154(b) by 147 days.

(21) Appl. No.: 13/730,884

(22) Filed: Dec. 29, 2012

(65) Prior Publication Data

US 2014/0022638 A1    Jan. 23, 2014

(30) Foreign Application Priority Data

Jul. 23, 2012  (CN) .......................... 2012 1 0255118

(51) Int. Cl.
*G02B 5/30* (2006.01)
*B82Y 20/00* (2011.01)
*B82Y 99/00* (2011.01)

(52) U.S. Cl.
CPC ............... *G02B 5/30* (2013.01); *G02B 5/3058* (2013.01); *B82Y 20/00* (2013.01); *B82Y 99/00* (2013.01)
USPC ............ 359/483.01; 359/485.03; 359/485.04; 359/485.05

(58) Field of Classification Search
CPC ...... G02B 5/30; G02B 5/3025; G02B 5/3041; G02B 5/3058; G02F 1/1335; G02F 1/1343
USPC ............. 359/483.01, 485.01, 485.03, 485.04, 359/485.05, 487.06; 349/96, 139; 977/742, 977/778, 888
See application file for complete search history.

(56) References Cited

U.S. PATENT DOCUMENTS

| | | | |
|---|---|---|---|
| 2008/0143906 A1* | 6/2008 | Allemand et al. | 349/43 |
| 2009/0051863 A1* | 2/2009 | Meisner | 349/143 |
| 2009/0085894 A1* | 4/2009 | Gandhi et al. | 345/175 |
| 2010/0097344 A1 | 4/2010 | Verweg | |
| 2010/0231549 A1 | 9/2010 | Chien et al. | |
| 2010/0271316 A1 | 10/2010 | Huang et al. | |
| 2011/0281068 A1* | 11/2011 | David et al. | 428/141 |
| 2011/0285941 A1* | 11/2011 | Liu et al. | 349/96 |
| 2012/0147472 A1* | 6/2012 | Kajiya et al. | 359/601 |

FOREIGN PATENT DOCUMENTS

| | | |
|---|---|---|
| TW | 201017264 | 5/2010 |
| TW | 201033880 | 9/2010 |
| TW | 201038997 | 11/2010 |
| TW | 098134306 | 4/2011 |
| TW | 201131452 | 9/2011 |
| TW | 201200937 | 1/2012 |
| TW | 201222349 | 6/2012 |
| TW | 201229579 | 7/2012 |

* cited by examiner

*Primary Examiner* — Suchin Parihar
*Assistant Examiner* — William R Alexander
(74) *Attorney, Agent, or Firm* — Novak Druce Connolly Bove + Quigg LLP (57) ABSTRACT

A polarizer, having touch sensing capability includes a first transparent conducive layer, a second transparent conducive layer, a polarizing layer, first electrodes and second electrodes. The first transparent conducive layer has a minimal resistance along a first direction and a maximal resistance or insulation along a second direction. The second transparent conducive layer has a maximal resistance or insulation along the first direction and a minimal resistance along the second direction. The polarizing layer is located between the first transparent conducive layer and the second transparent conducive layer. The first electrodes are spaced with each other and arranged in a first row along the second direction and electrically connected with the first transparent conducive layer. The second electrodes are spaced with each other and arranged in a second row along the first direction and electrically connected with the second transparent conducive layer.

18 Claims, 10 Drawing Sheets

POLARIZER

CROSS-REFERENCE TO RELATED APPLICATIONS

This application claims all benefits accruing under 35 U.S.C. §119 from China Patent Application No. 201210255118.X, filed on Jul. 23, 2012 in the China Intellectual Property Office, the content of which is hereby incorporated by reference. This application is related to commonly-assigned applications entitled, "POLARIZER", filed on Dec. 28, 2012, Ser. No. 13/730,711; "LIQUID CRYSTAL DISPLAY MODULE", filed on Apr. 25, 2013, Ser. No. 13/869,958, "LIQUID CRYSTAL DISPLAY MODULE", filed on Apr. 25, 2013, Ser. No. 13/869,959, "METHOD FOR MAKING LIQUID CRYSTAL DISPLAY MODULE", filed on Apr. 25, 2013, Ser. No. 13/869,961, "METHOD FOR MAKING LIQUID CRYSTAL DISPLAY MODULE", filed on Apr. 25, 2013, Ser. No. 13/869,964, "LIQUID CRYSTAL DISPLAY MODULE", filed on Mar. 15, 2013, Ser. No. 13/837,266, and "LIQUID CRYSTAL DISPLAY MODULE", filed on Mar. 15, 2013, Ser. No. 13/837,359.

BACKGROUND

1. Technical Field

The present disclosure relates to a polarizer used in a liquid crystal display screen with touch sensing capability.

2. Description of Related Art

A conventional liquid crystal display screen for a liquid crystal display (LCD), according to the prior art, generally includes a first polarizer, a thin film transistor (TFT) panel, a first alignment layer, a liquid crystal layer, a second alignment layer, a common electrode layer (e.g., an indium tin oxide (ITO) layer), an upper board, and a second polarizer. The TFT panel includes a plurality of pixel electrodes. Polarizing directions of the first and second polarizers are perpendicular to each other. When a voltage is applied between the pixel electrode and the common electrode layer, the liquid crystal molecules in the liquid crystal layer between the first alignment layer and the second alignment layer align along a same direction to polarize the light beams by the first polarizer irradiate on the second polarizer directly without rotation, and the polarized light beams cannot pass through the first polarizer. Without a voltage applied to the pixel electrode and the common electrode layer, the polarized light beams rotated by the liquid crystal molecules can pass through the second polarizer. Selectively applying voltages between different pixel electrodes and the common electrode layer can control the on and off of different pixels, thus displaying images.

A conventional polarizing layer is made by using a transparent polymer film (e.g., PVA film) to absorb dichroic material, to let the dichroic material infiltrated into the transparent polymer film, and extruding the transparent polymer film to align the dichroic material in one direction. A conventional polarizer includes not only the polarizing layer but also protective layers, adhesive layer, separating layer covered on two opposite surfaces of the polarizing layer. During the manufacturing of the liquid crystal display screen, the second polarizer is directly attached to a top surface of the upper board.

Following the advancement in recent years of various electronic apparatuses, such as mobile phones, car navigation systems and the like, toward high performance and diversification, there has been continuous growth in the number of electronic apparatuses equipped with optically transparent touch panels in front of their respective display devices (e.g., liquid crystal display screen). The touch panel is commonly attached to the top surface of the second polarizer. However, this arrangement will increase a thickness of the electronic apparatuses. Further, the touch panel and the second polarizer are individually manufactured and assembled, which increases the complication of the manufacturing process, and increases a cost for production.

What is needed, therefore, is to provide a polarizer capable of sensing touches occurred thereon meanwhile polarizing lights, thus the liquid crystal display screen using the polarizer does not need to have a separate touch panel.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
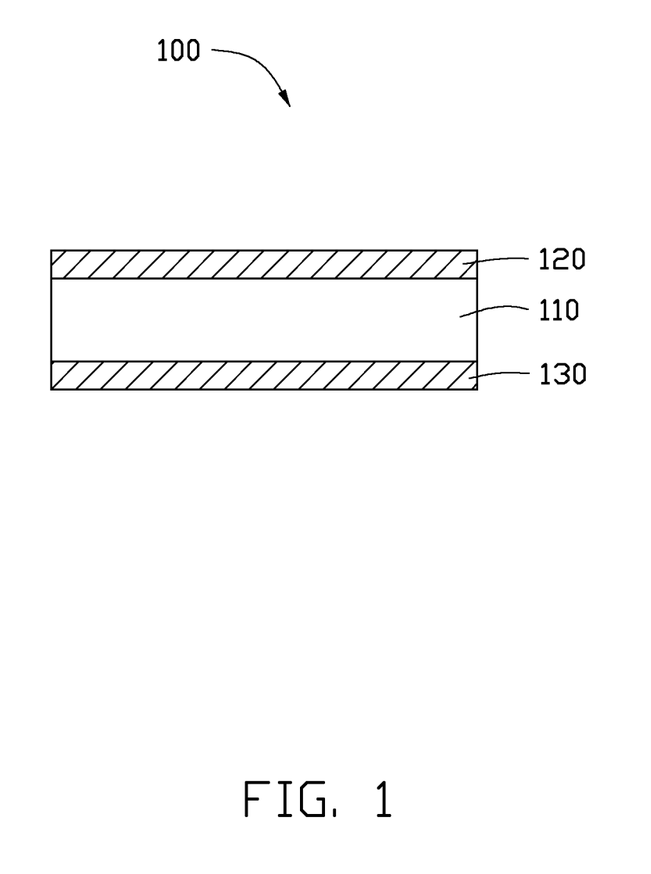
FIG. 1 is a side view of an embodiment of a polarizer.
Figure 2:
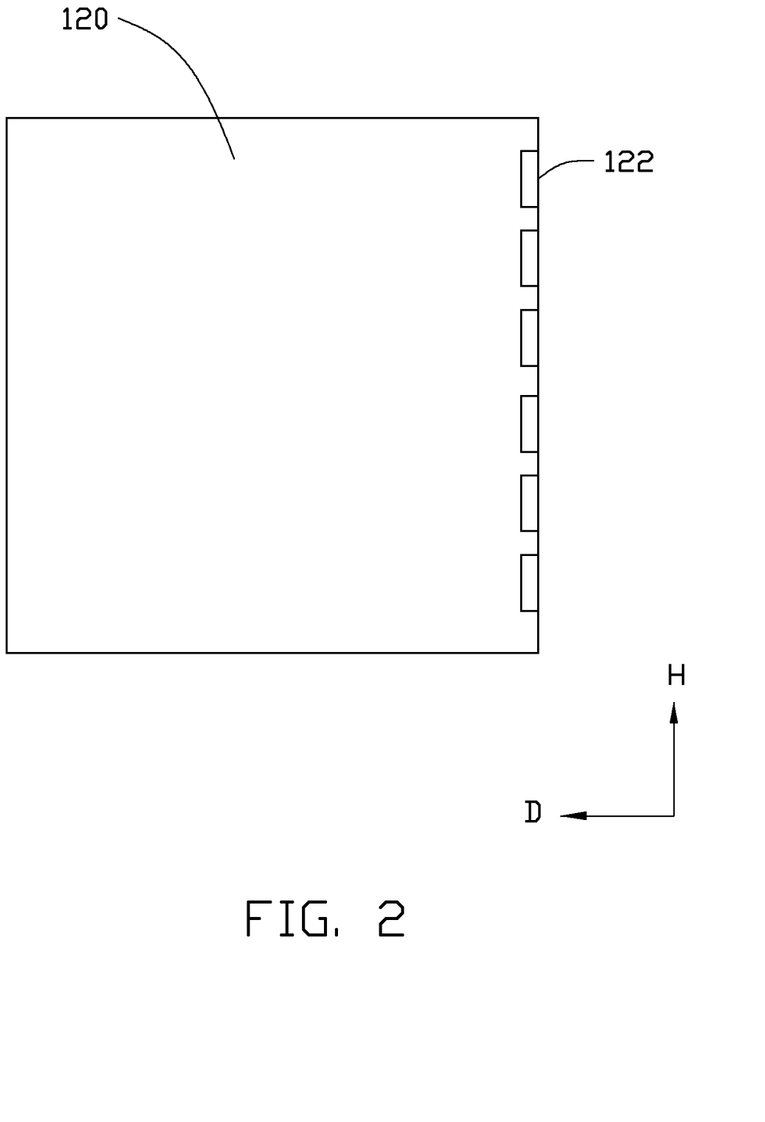
FIG. 2 is a top view of an embodiment of a first transparent conductive layer of the polarizer.
Figure 3:
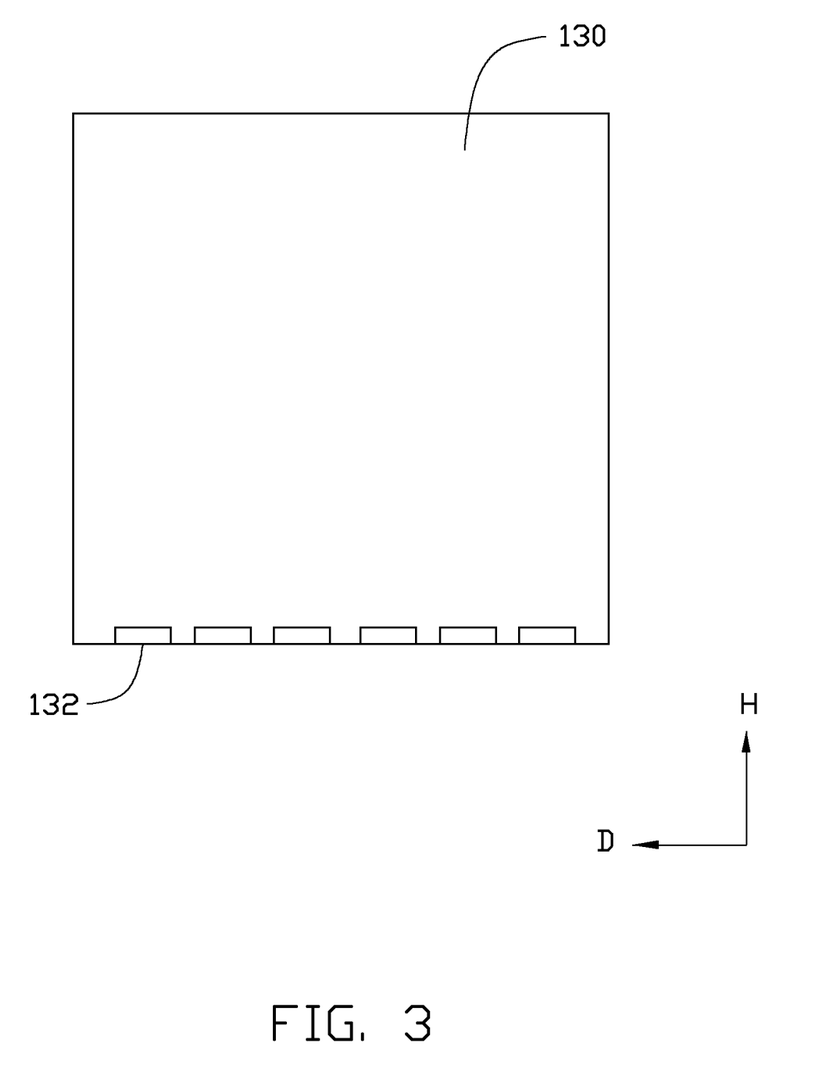
FIG. 3 is a top view of an embodiment of a second transparent conductive layer of the polarizer.

Referring to FIG. 1, FIG. 2 and FIG. 3, one embodiment of a polarizer 100 is capable of sensing touches and polarizing lights and includes a polarizing layer 110, a first transparent conductive layer 120, a second transparent conductive layer 130, a plurality of first electrodes 122, and a plurality of second electrodes 132. The polarizer 100 is suitable for a touch sensing type liquid crystal display screen, and it is especially suitable for being used as an upper polarizer (i.e., the second polarizer) in the touch sensing type liquid crystal display screen. The polarizing layer 110 is located between the first transparent conductive layer 120 and the second transparent conductive layer 130 to space the first transparent conductive layer 120 from the second transparent conductive layer 130. Thus, an induction capacitance can be formed between the first transparent conductive layer 120 and the second transparent conductive layer 130. The plurality of first electrodes 122 are spaced with each other and electrically connected with the first transparent conductive layer 120. The plurality of second electrodes 132 are spaced from each other and electrically connected with the second transparent conductive layer 130. The plurality of first electrodes 122 and the plurality of second electrodes 132 are respectively used to drive and sense the polarizer 100 to determine a touch location on the polarizer 100.

The polarizing layer 110 can be an insulating material layer having a light polarizing function. More specifically, the polarizing layer 110 includes a transparent polymer film (e.g., PVA film) and a dichroism material infiltrated in the transparent polymer film. The dichroism material can be iodoquinine sulfate. The molecules of the dichroism material can align along the same direction.

The first transparent conductive layer 120 and the second transparent conductive layer 130 can be directly in contact with the two opposite surfaces of the polarizing layer 110. The first transparent conductive layer 120 can have a minimal resistance along a first direction and a maximal resistance or insulation along a second direction compared with other resistances along other directions of the first transparent conductive layer 120. The second transparent conductive layer 130 can have a maximal resistance or insulation along the first direction and a minimal resistance along the second direction compared with other resistances along other directions of the second transparent conductive layer 130. The first direction is substantially perpendicular to the second direction. The first direction and the second direction are both parallel to the surface of the polarizing layer 110.

The first transparent conductive layer 120 and the second transparent conductive layer 130 can both be square shaped layer respectively having two sides perpendicular to the first direction and two sides perpendicular to the second direction.

The first transparent conductive layer 120 and the transparent conductive layer 130 can both be a single direction conducting layer or an anisotropic impedance layer. In the present disclosure, the single direction conducting means the layer is electrically conductive along a single direction, and electrically insulating along other directions (e.g., a direction perpendicular to the conductive single direction). The single direction conducting layer can be achieved by arranging a plurality of spaced and parallel conductive wires to form the single direction conducting layer. In the present disclosure, the anisotropic impedance means a continuous structure having a relatively low impedance direction D and a relatively high impedance direction H on the same surface (e.g., the surface of the transparent conductive layer 120). The electrical conductivity of the anisotropic impedance layer on the relatively high impedance direction H is smaller than the electrical conductivities of the anisotropic impedance layer in other directions. The electrical conductivity of the anisotropic impedance layer on the relatively low impedance direction D is larger than the electrical conductivities of the anisotropic impedance layer on other directions. The relatively high impedance direction H is different from the relatively low impedance direction D. In one embodiment, the relatively high impedance direction H is perpendicular to the relatively low impedance direction D. The relatively high impedance direction H and the relatively low impedance direction D of the anisotropic impedance layer can be achieved by having a plurality of conductive belts having a low conductivity aligned along the relatively high impedance direction H and a plurality of conductive belts having a high conductivity aligned along the relatively low impedance direction D, the plurality of conductive belts having the low conductivity and the plurality of conductive belts having the low conductivity are electrically connected with each other. In another embodiment, the relatively high impedance direction H and the relatively low impedance direction D of the anisotropic impedance layer can be achieved by having a carbon nanotube film comprising orderly arranged carbon nanotubes.

When the first transparent conductive layer 120 is the anisotropic impedance layer, the relatively high impedance direction H of the first transparent conductive layer 120 is the second direction, the relatively low impedance direction D of the first transparent conductive layer 120 is the first direction. When the second transparent conductive layer 130 is the anisotropic impedance layer, the relatively high impedance direction H of the second transparent conductive layer 130 is the first direction, the relatively low impedance direction D of the second transparent conductive layer 130 is the second direction.

When the first transparent conductive layer 120 is the single direction conducting layer, the first direction is the conducting direction of the first transparent conductive layer 120. When the second transparent conductive layer 130 is the single direction conducting layer, the second direction is the conducting direction of the second transparent conductive layer 130.

The plurality of first electrodes 122 are spaced with each other and arranged in a row along the second direction. More specifically, the plurality of first electrodes 122 are arranged on the side of the first transparent conductive layer 120 perpendicular to the first direction. The plurality of second electrodes 132 are spaced with each other and arranged in a row along the first direction. More specifically, the plurality of second electrodes 132 are arranged on the side of the second transparent conductive layer 130 perpendicular to the second direction. The first electrodes 122 and the second electrodes 132 can be located on the surfaces of the first and second transparent conductive layers 120, 130, near the sides. The first electrodes 122 and the second electrodes 132 can be formed by screen printing, sputtering, evaporating, or coating methods.

The polarizer 100 can further include conducting wires (not shown), to electrically connect the first electrodes 122 and the second electrodes 132 to the outer circuit. The conducting wires can be arranged around the first and second transparent conductive layers 120, 130 with the first and second electrodes 122, 132.

Figure 4:
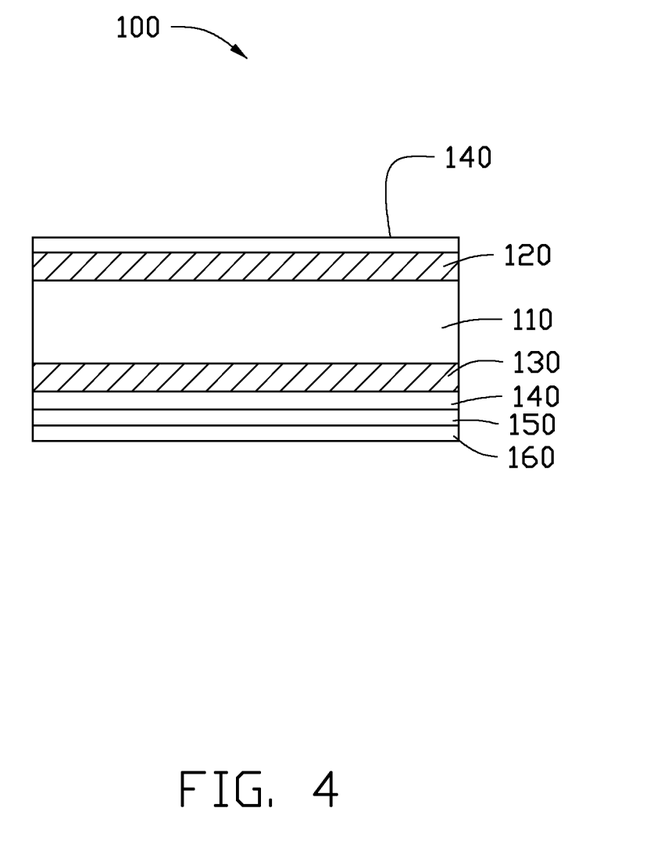
FIG. 4 is a side view of another embodiment of the polarizer.

Referring to FIG. 4, the polarizer 100 can further include at least one of a protective layer 140, an adhesive layer 150, and a release layer 160. The protective layer 140 is used to protect the polarizing layer 110 and the first and second transparent conductive layers 120, 130. The adhesive layer 150 is used to combine the polarizer 100 to an upper board of a liquid crystal display screen. The release layer 160 is used to protect the adhesive layer 150, and can be released or peeled from the adhesive layer 150 to contact the adhesive layer 150 to the upper board of the liquid crystal display screen. The material of the protective layer 140 can be at least one of triacetyl cellulose (TAC), polystyrene, polyethylene, polyethylene terephthalate (PET), poly(methyl methacrylate) (PMMA), polycarbonate (PC), and benzocyclobutene (BCB). The material of the adhesive layer 150 can be UV adhesive, pressure sensitive adhesive, or thermal sensitive adhesive.

The polarizing layer 110 can solely form a polarizer main body, or cooperatively form the polarizer main body with at least one of the protective layer 140, the adhesive layer 150, and the release layer 160. The first and second transparent conductive layers 120, 130 can be respectively arranged on two surfaces of the polarizer main body, or inserted into the polarizer main body.

In one embodiment, the polarizer 100 includes two protective layers 140 respectively attached to the surfaces of the first and second transparent conductive layers 120, 130, to sandwich the first and second transparent conductive layers 120, 130 between the two protective layers 140. The first and second transparent conductive layers 120, 130 are located between the two protective layers 140. The adhesive layer 150 is arranged on the surface of the protective layer 140 which is near to the second transparent conductive layer 130. The release layer 160 covers the outer surface of the adhesive layer 150.

Figure 5:
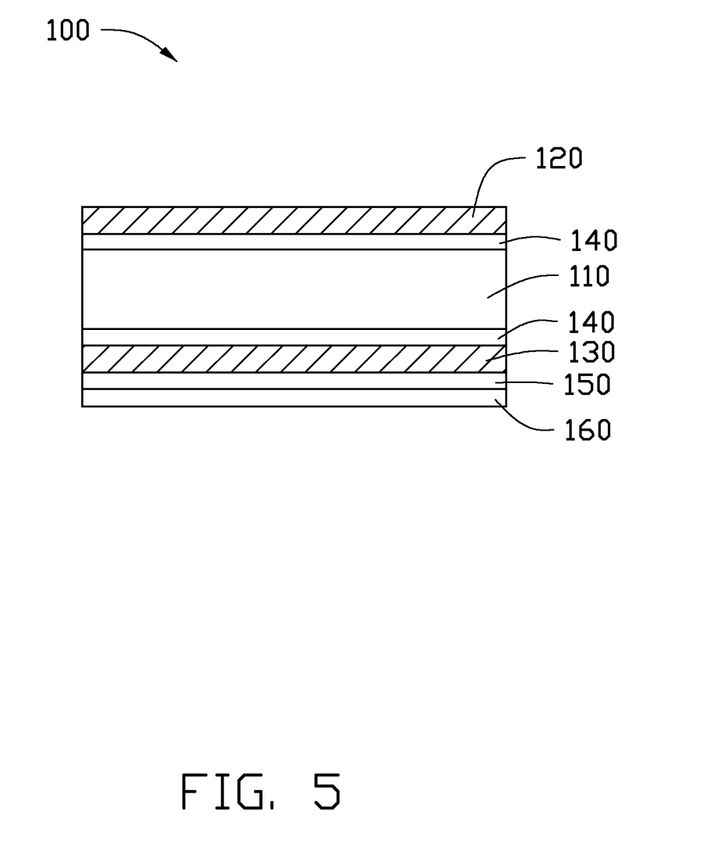
FIG. 5 is a side view of yet another embodiment of the polarizer.

Referring to FIG. 5, in another embodiment, the polarizer 100 includes two protective layers 140 respectively attached to the two surfaces of the polarizing layer 110, to sandwich the polarizing layer 110 between the two protective layers 140. The polarizing layer 110 is located between the two protective layers 140. The first and second transparent conductive layers 120, 130 are arranged on the outer surfaces of the two protective layers 140. The two protective layers 140 and the polarizing layer 110 are located between the first and second transparent conductive layers 120, 130. The adhesive layer 150 is arranged on the outer surface of the second transparent conductive layer 130, to sandwich the second transparent conductive layer 130 between the adhesive layer 150 and the protective layer 140. The release layer 160 covers the outer surface of the adhesive layer 150.

Figure 6:
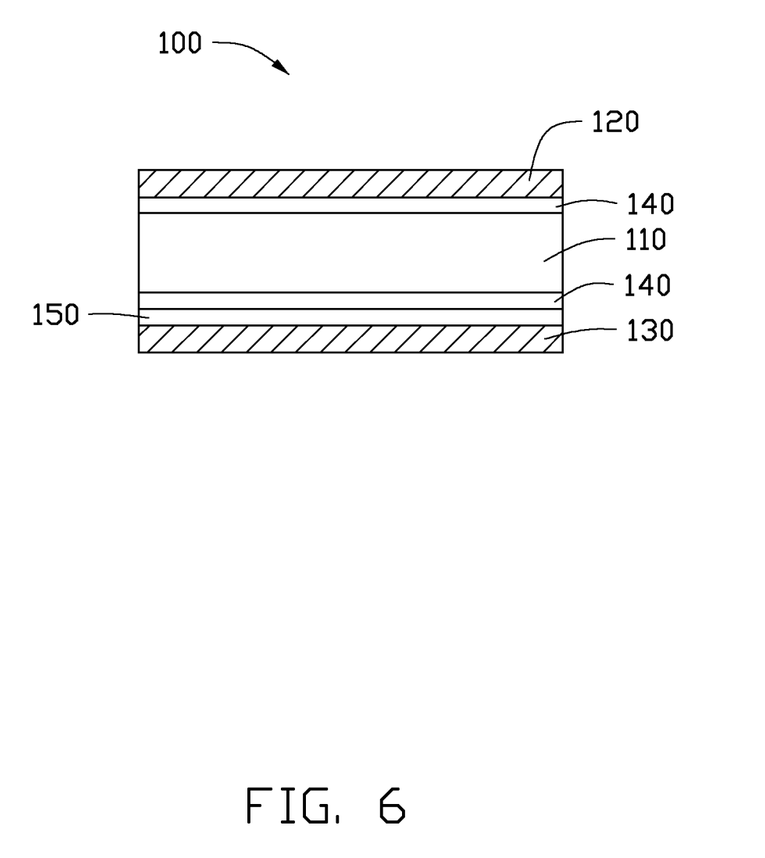
FIG. 6 is a side view of yet another embodiment of the polarizer.

Referring to FIG. 6, in yet another embodiment, the polarizer 100 includes two protective layers 140 respectively attached to the two surfaces of the polarizing layer 110, to sandwich the polarizing layer 110 between the two protective layers 140. The adhesive layer 150 is arranged on the outer surface of one of the two protective layers 140. The first transparent conductive layer 120 is arranged on the outer surface of another of the two protective layers 140. The second transparent conductive layer 130 is arranged on the outer surface of the adhesive layer 150. The two protective layers 140, the polarizing layer 110, and the adhesive layer 150 are located between the first and second transparent conductive layers 120, 130.

In the above described embodiments, the first and second transparent conductive layers 120, 130 can respectively be a carbon nanotube film having a anisotropic impedance property. The carbon nanotube films can be free-standing films formed independent from the other parts of the polarizer 100 and further attached to the needing surfaces in the polarizer 100. In the first transparent conductive layer 120, the majority of the carbon nanotubes in the carbon nanotube film are aligned along the first direction. In the second transparent conductive layer 130, the majority of the carbon nanotubes in the carbon nanotube film are aligned along the second direction.

In the carbon nanotube film, the plurality carbon nanotubes are orderly arranged. The plurality of carbon nanotubes are substantially aligned along a same direction so that the carbon nanotube film has a maximum electrical conductivity at the aligned direction of the carbon nanotubes which is greater than at other directions. The aligned direction of the plurality of carbon nanotubes is the relatively low impedance direction D. The carbon nanotube film can be formed by drawing the film from a carbon nanotube array. The overall aligned direction of a majority of the carbon nanotubes in the carbon nanotube film is substantially aligned along the same direction and parallel to a surface of the carbon nanotube film. The carbon nanotube is joined to adjacent carbon nanotubes end to end by van der Waals force therebetween, and the carbon nanotube film is capable of being a free-standing structure. A support having a large surface area to support the entire free-standing carbon nanotube film is not necessary, and only a supportive force at opposite sides of the film is sufficient. The free-standing carbon nanotube film can be suspended and maintain its own film state with only supports at the opposite sides of the film. When disposing (or fixing) the carbon nanotube film between two spaced supports, the carbon nanotube film between the two supports can be suspended while maintaining its integrity. The successively and aligned carbon nanotubes joined end to end by van der Waals force in the carbon nanotube film is the main reason for the free-standing property. The carbon nanotube film drawn from the carbon nanotube array has a good transparency. In one embodiment, the carbon nanotube film is substantially a pure film and consists essentially of the carbon nanotubes, and to increase the transparency of the touch panel, the carbon nanotubes are not functionalized. The free-standing carbon nanotube film can be directly attached to the surface of the polarizing layer.

Figure 7:
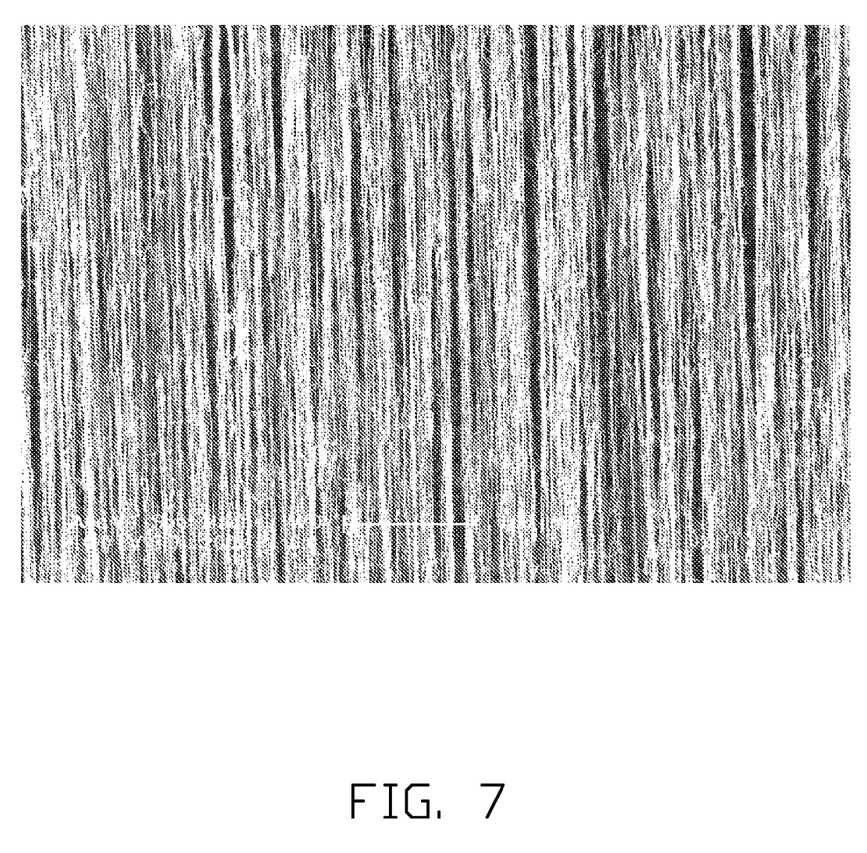
FIG. 7 shows a Scanning Electron Microscope (SEM) image of a carbon nanotube film.

Referring to FIG. 7, the plurality of carbon nanotubes in the carbon nanotube film have a preferred orientation along the same direction. The preferred orientation means that the overall aligned direction of the majority of carbon nanotubes in the carbon nanotube film is substantially along the same direction. The overall aligned direction of the majority of carbon nanotubes is substantially parallel to the surface of the carbon nanotube film, thus parallel to the surface of the polarizing layer. Furthermore, the majority of carbon nanotubes are joined end to end therebetween by van der Waals force. In one embodiment, the majority of carbon nanotubes are substantially aligned along the same direction in the carbon nanotube film, with each carbon nanotube joined to adjacent carbon nanotubes at the aligned direction of the carbon nanotubes end to end by van der Waals force. There may be a minority of carbon nanotubes in the carbon nanotube film that are randomly aligned, but the number of randomly aligned carbon nanotubes is very small compared to the majority of substantially aligned carbon nanotubes and therefore will not affect the overall oriented alignment of the majority of carbon nanotubes in the carbon nanotube film.

In the carbon nanotube film, the majority of carbon nanotubes that are substantially aligned along the same direction may not be completely straight. Sometimes, the carbon nanotubes can be curved or not exactly aligned along the overall aligned direction, and can deviate from the overall aligned direction by a certain degree. Therefore, it cannot be excluded that partial contacts may exist between the juxtaposed carbon nanotubes in the majority of carbon nanotubes aligned along the same direction in the carbon nanotube film. Despite having curved portions, the overall alignment of the majority of the carbon nanotubes are substantially aligned along the same direction.

Figure 8:
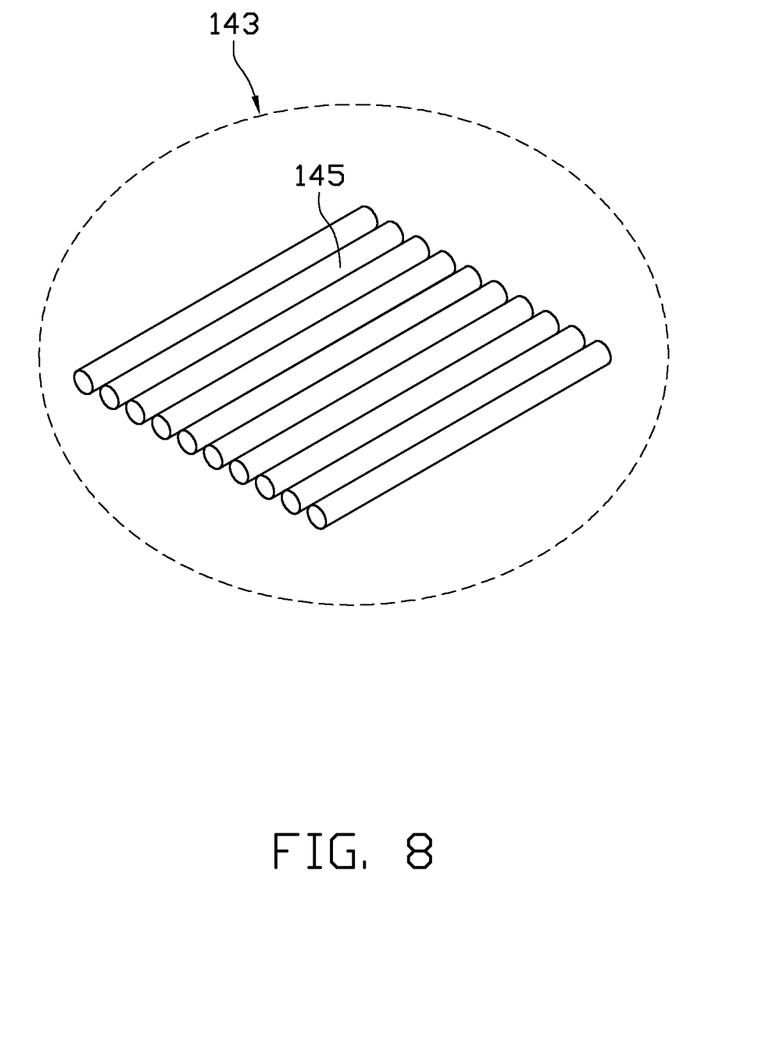
FIG. 8 is a structural schematic view of an embodiment of a carbon nanotube segment in the carbon nanotube film.

Referring to FIG. 8, the carbon nanotube film includes a plurality of successive and oriented carbon nanotube segments 143. The plurality of carbon nanotube segments 143 are joined end to end by van der Waals force. Each carbon nanotube segment 143 includes a plurality of carbon nanotubes 145 that are substantially parallel to each other, and the plurality of parallel carbon nanotubes 145 are in contact with each other and combined by van der Waals force therebetween. The carbon nanotube segment 143 can have a desired length, thickness, uniformity, and shape. The carbon nanotubes 145 in the carbon nanotube film have a preferred orientation along the same direction. The carbon nanotube wires in the carbon nanotube film can consist of a plurality of carbon nanotubes joined end to end. The adjacent and juxtaposed carbon nanotube wires can be connected by the randomly aligned carbon nanotubes. There can be clearances between adjacent and juxtaposed carbon nanotubes in the carbon nanotube film. A thickness of the carbon nanotube film at the thickest location is about 0.5 nanometers to about 100 microns (e.g., in a range from 0.5 nanometers to about 10 microns).

A method for drawing the carbon nanotube film from the carbon nanotube array includes: (a) selecting a carbon nanotube segment 143 from a carbon nanotube array using a drawing tool, such as an adhesive tape or adhesive substrate bar contacting the carbon nanotube array, to select the carbon nanotube segment 143; and (b) moving the drawing tool and drawing the selected carbon nanotube segment 143 at a certain speed, such that a plurality of carbon nanotube segments 143 are drawn joined end to end, thereby forming a successive carbon nanotube film. The plurality of carbon nanotubes of the carbon nanotube segment 143 are juxtaposed to each other. While the selected carbon nanotube segment 143 gradually separates from the growing substrate of the carbon nanotube array along the drawing direction under the drawing force, the other carbon nanotube segments 143 that are adjacent to the selected carbon nanotube segment 143 are successively drawn out end to end under the action of the van der Waals attractive force, thus forming a successive and uniform carbon nanotube film having a width and preferred orientation.

The carbon nanotube film has a unique impedance property because the carbon nanotube film has a minimum electrical impedance in the drawing direction, and a maximum electrical impedance in the direction perpendicular to the drawing direction, thus the carbon nanotube film has an anisotropic impedance property. A relatively low impedance direction D is the direction substantially parallel to the aligned direction of the carbon nanotubes, and a relatively high impedance direction H is substantially perpendicular to the aligned direction of the carbon nanotubes. The carbon nanotube film can have a square shape with four sides. Two sides are opposite to each other and substantially parallel to the relatively high impedance direction H. The other two sides are opposite to each other and substantially parallel to the relatively low impedance direction D. In one embodiment, a ratio between the impedance at the relatively high impedance direction H and the impedance at the relatively low impedance direction D of the carbon nanotube film is equal to or greater than 50 (e.g., in a range from 70 to 500).

The first and/or second transparent conductive layers 120, 130 can include a plurality of carbon nanotube films laminated to each other or arranged side to side. The carbon nanotubes in the plurality of carbon nanotube films are aligned along the same direction. The carbon nanotube film can have a transmittance of visible light above 85%.

Because the carbon nanotubes can absorb the part of the lights having the polarizing direction parallel to the carbon nanotubes, the polarizing direction of the polarizing layer 110 can be the first direction or the second direction.

In one embodiment, the driving mode of the first and second transparent conductive layers 120, 120 inputs electrical signals to the plurality of first electrodes 122; receives sensing signals from the plurality of second electrodes 132; and determines the touch location by using the sensing signals.

Due to the first transparent conductive layer 120 is the anisotropic impedance layer, and has a relatively high conductivity along the first direction, by arranging the plurality of first electrodes 122 in the row along the second direction, the first transparent conductive layer 120 can be seen as a plurality of spaced conductive belts parallel to each other and to the first direction. The plurality of spaced conductive belts are respectively connected to the plurality of first electrodes 122 in one to one manner. Similarly, the second transparent conductive layer 130 has a relatively high conductivity along the second direction, the second transparent conductive layer 130 can be seen as a plurality of spaced conductive belts parallel to each other and to the second direction. The plurality of spaced conductive belts are respectively connected to the plurality of second electrodes 132 in one to one manner. Thus, the first and second transparent conductive layers 120, 130 can be seen as a plurality of conductive belts crossed with each other. The first and second transparent conductive layers 120, 130 are insulated from each other by the polarizing layer 110 and overlap with each other along the thickness direction of the polarizer 100, thus forming a plurality of induction capacitances at the crossing points of the plurality of conductive belts. When the polarizer 100 is touched by a touch tool (e.g., a conductive substance such as fingers), the induction capacitance near the touch location is changed. The changing of the induction capacitance can be detected by the outer circuit connected to the first and second electrodes 122, 132. When more than one locations are touched, more than one induction capacitances near the touch locations are changed, and all can be detected by the outer circuit. More specifically, the induction capacitances can be charged by the outer circuit through the first and second electrodes 122, 132. The outer circuit can include a driving circuit and a sensing circuit. The driving circuit can alternately or simultaneously input the same signal to the plurality of first electrodes 122. The signal can be a pulsed signal. The sensing circuit can readout the sensing signals from the plurality of second electrodes 132. By comparing the plurality of sensing signals, the sensing signal having the largest change between before and after the touching can be found. The positions of corresponded first and second electrodes are the touch locations on the first and second directions.

Figure 9:
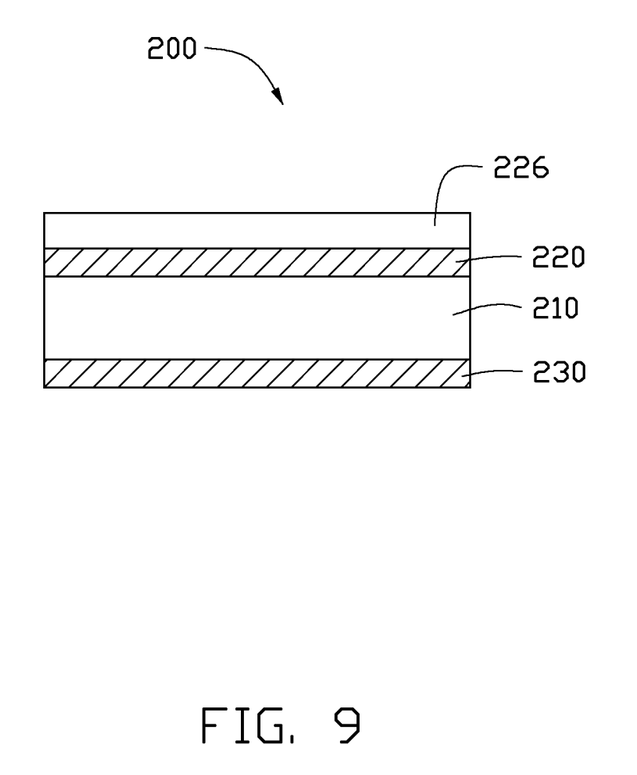
FIG. 9 is a side view of another embodiment of the polarizer.
Figure 10:
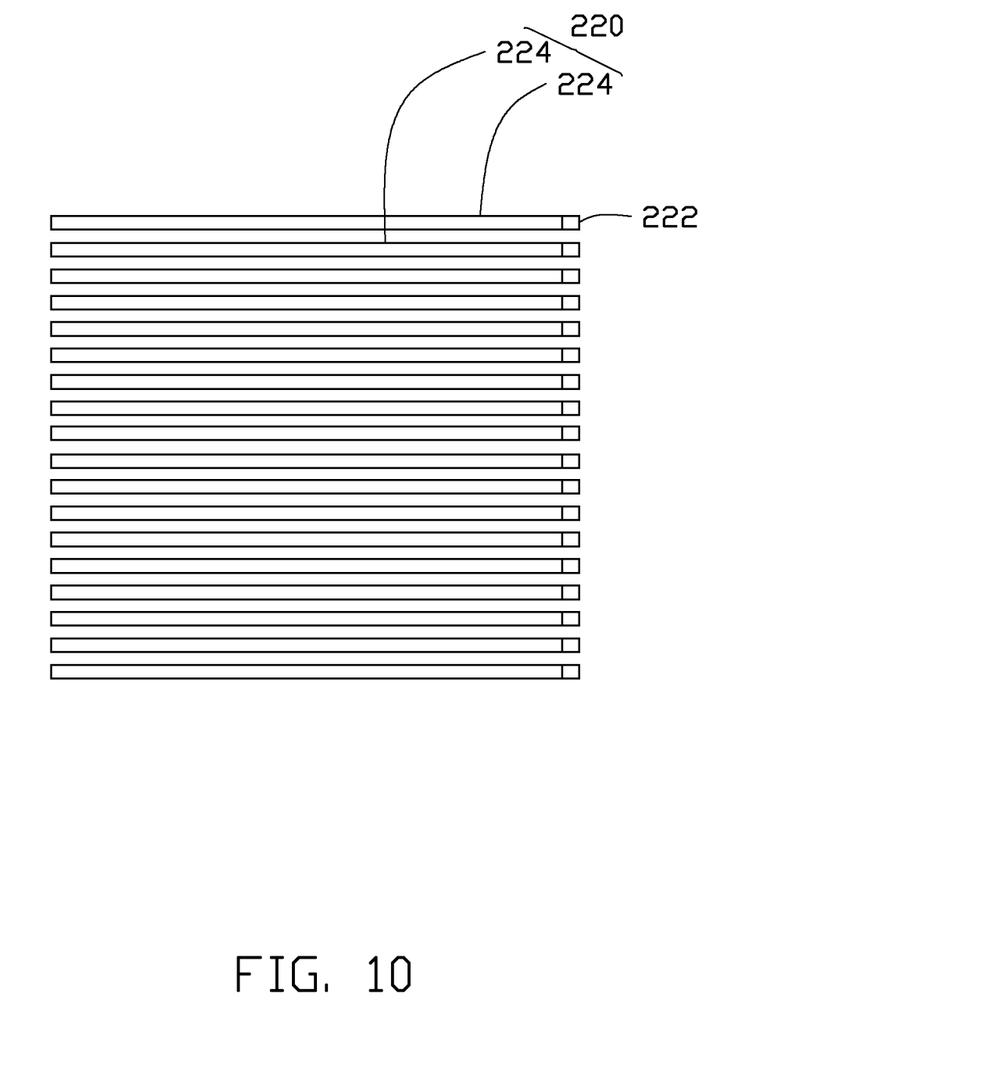
FIG. 10 is a top view of another embodiment of the first transparent conductive layer of the polarizer.

Referring to FIG. 9 and FIG. 10, another embodiment of the polarizer 200 includes a polarizing layer 210, a first transparent conductive layer 220, a second transparent conductive layer 230, a plurality of first electrodes 222, and a plurality of second electrodes. The polarizing layer 210 is located between the first transparent conductive layer 220 and the second transparent conductive layer 230. The plurality of the first electrodes 222 are spaced from each other and electrically connected with the first transparent conductive layer 220. The plurality of the second electrodes are spaced from each other and electrically connected with the second transparent conductive layer 230.

The polarizer 200 is similar to the polarizer 100, except that the polarizer 200 further includes a transparent rigid substrate 226. The first transparent conductive layer 220 is located between the transparent rigid substrate 226 and the polarizing layer 210. The first transparent conductive layer 220 is a patterned metal oxide layer formed on the surface of the transparent rigid substrate 226. The patterned metal oxide layer includes a plurality of transparent conductive belts 224 spaced from each other and parallel to the first direction. The plurality of first electrodes 222 are respectively connected to the plurality of transparent conductive belts 224 in one to one manner.

More specifically, the material of the plurality of transparent conductive belts 224 is ITO or antimony tin oxide (ATO). The metal oxide material should be sputtered on the surface of the transparent rigid substrate 226 to satisfy the transparency and uniform conductivity requirements for the first transparent conductive layer 220, the plurality of transparent conductive belts 224 should be previously formed on the surface of the transparent rigid substrate 226, and the transparent rigid substrate 226 having the plurality of transparent conductive belts 224 formed thereon is then covered to the polarizing layer 210. The material of the transparent rigid substrate 226 an insulating material such as glass or crystal. Moreover, the metal oxide such as the ITO or the ATO does not have the anisotropic impedance property, the plurality of transparent conductive belts 224 should be spaced from each other to make the first transparent conductive layer 220 having the single direction conducting property along the first direction. The width and pitch of the transparent conductive belts 224 can be decided by actual need. In one embodiment, the pitch of the transparent conductive belts 224 is in a range from about 10 microns to about 500 microns, the width of each transparent conductive belt 224 is in a range from about 10 microns to about 5 millimeters. When the first transparent conductive layer 220 is the transparent conductive belts 224, the second transparent conductive layer 230 can be the carbon nanotube film having the carbon nanotubes aligned along the second direction, meanwhile the polarizing direction of the polarizing layer 210 can be the second direction.

In the above described embodiments, the second transparent conductive layer can be the freestanding carbon nanotube film having the anisotropic impedance property. The freestanding carbon nanotube film can be formed independently from the other parts of the polarizer, and further attached to the needing surface in the polarizer.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A polarizer, having touch sensing capability, comprising:
    a first transparent conductive layer having a minimal resistance along a first direction and a maximum resistance or insulation along a second direction;
    a second transparent conductive layer having a maximum resistance or insulation along the first direction and a minimal resistance along the second direction;
    a polarizing layer located between the first transparent conductive layer and the second transparent conductive layer, a polarizing direction of the polarizing layer is one of the first direction and the second direction;
    a plurality of first electrodes being spaced with each other and arranged in a first row along the second direction and electrically connected with the first transparent conductive layer; and
    a plurality of second electrodes being spaced with each other and arranged in a second row along the first direction and electrically connected with the second transparent conductive layer.

2. The polarizer of claim 1, wherein the first direction is substantially perpendicular to the second direction.

3. The polarizer of claim 1, wherein the plurality of first electrodes are arranged on a side of the first transparent conductive layer, and the side of the first transparent conductive layer is perpendicular to the first direction; and the plurality of second electrodes are arranged on a side of the second transparent conductive layer, and the side of the second transparent conductive layer is perpendicular to the second direction.

4. The polarizer of claim 1, wherein each of the first transparent conductive layer and the second transparent conductive layer is an anisotropic impedance layer.

5. The polarizer of claim 4, wherein each of the first transparent conductive layer and the second transparent conductive layer comprises a carbon nanotube film, a majority of carbon nanotubes in the carbon nanotube film of the first transparent conductive layer are substantially aligned along the first direction, and a majority of carbon nanotubes in the carbon nanotube film of the second transparent conductive layer is substantially aligned along the second direction.

6. The polarizer of claim 5, wherein the majority of carbon nanotubes are joined end to end by van der Waals attractive force therebetween.

7. The polarizer of claim 5, wherein the majority of carbon nanotubes are substantially parallel to a surface of the polarizing layer.

8. The polarizer of claim 5, wherein the carbon nanotube film is a free-standing carbon nanotube film directly attached to a surface of the polarizing layer.

9. The polarizer of claim 2, wherein the first transparent conductive layer is a single direction conducting layer, the second transparent conductive layer is an anisotropic impedance layer.

10. The polarizer of claim 9, wherein the first transparent conductive layer comprises a plurality of transparent conductive belts spaced from each other and parallel to the first direction, the second transparent conductive layer comprises a carbon nanotube film, and a majority of carbon nanotubes in the carbon nanotube film of the second transparent conductive layer are substantially aligned along the second direction.

11. The polarizer of claim 10, wherein the majority of carbon nanotubes are joined end to end by van der Waals attractive force therebetween.

12. The polarizer of claim 10, wherein the polarizing direction of the polarizing layer is the second direction.

13. The polarizer of claim 9 further comprising a transparent rigid substrate, wherein the first transparent conductive layer is located between the transparent rigid substrate and the polarizing layer, and a material of the plurality of transparent conductive belts are at least one of indium tin oxide and antimony tin oxide.

14. The polarizer of claim 1 further comprising two protective layers, wherein the first transparent conductive layer, the second transparent conductive layer, and the polarizing layer are located between the two protective layers.

15. The polarizer of claim 1 further comprising two protective layers, wherein the polarizing layer is located between the two protective layers, the two protective layers and the polarizing layer are located between the first transparent conductive layer and the second transparent conductive layer.

16. The polarizer of claim 1 further comprising two protective layers and an adhesive layer; wherein the polarizing layer is located between the two protective layers, the adhesive layer is located on a surface of one of the two protective layers, the first transparent conductive layer is located on a surface of another of the two protective layers; and the two protective layers, the adhesive layer, and the polarizing layer are located between the first transparent conductive layer and the second transparent conductive layer.

17. A polarizer, having touch sensing capability, comprising:
    a first transparent conductive layer having a minimal resistance along a first direction and a maximum resistance or insulation along a second direction;

a second transparent conductive layer having a maximum resistance or insulation along the first direction and a minimal resistance along the second direction;

a polarizing layer located between the first transparent conductive layer and the second transparent conductive layer, and the first transparent conductive layer and the second transparent conductive layer being in direct contact with two opposite surfaces of the polarizing layer;

a plurality of first electrodes being spaced with each other and arranged in a first row along the second direction and electrically connected with the first transparent conductive layer; and a plurality of second electrodes being spaced with each other and arranged in a second row along the first direction and electrically connected with the second transparent conductive layer.

18. A polarizer, having touch sensing capability, comprising:

a first transparent conductive layer having a minimal resistance along a first direction and a maximum resistance or insulation along a second direction;

a second transparent conductive layer having a maximum resistance or insulation along the first direction and a minimal resistance along the second direction;

a polarizing layer located between the first transparent conductive layer and the second transparent conductive layer;

two protective layers being in direct contact with two opposite surfaces of the polarizing layer, the polarizing layer being located between the two protective layers, and the two protective layers and the polarizing layer are located between the first transparent conductive layer and the second transparent conductive layer;

a plurality of first electrodes being spaced with each other, arranged in a first row along the second direction, and electrically connected with the first transparent conductive layer; and a plurality of second electrodes being spaced with each other, arranged in a second row along the first direction, and electrically connected with the second transparent conductive layer.

* * * * *